United States Patent [19]

Scott et al.

[11] Patent Number: 4,556,465
[45] Date of Patent: Dec. 3, 1985

[54] METHOD OF CONCENTRATING SILICA IN AN AQUEOUS ALKALI METAL SILICATE SOLUTION

[75] Inventors: Graham W. Scott, Northwich; James H. Steven, Runcorn, both of England

[73] Assignee: Imperial Industries plc, London, England

[21] Appl. No.: 653,045

[22] Filed: Sep. 21, 1984

[30] Foreign Application Priority Data

Sep. 23, 1983 [GB] United Kingdom ............... 8325477

[51] Int. Cl.$^4$ ........................... C25B 7/00; C25B 1/16
[52] U.S. Cl. .................................. 204/182.2; 204/98;
204/301; 423/332; 423/335; 423/339
[58] Field of Search ............... 204/86, 98, 101, 180 P,
204/301; 423/332, 335, 339

[56] References Cited

U.S. PATENT DOCUMENTS

| | | | |
|---|---|---|---|
| 3,654,105 | 4/1972 | Chilton | 204/101 |
| 3,668,088 | 6/1972 | Iler | 204/101 |
| 4,124,471 | 11/1978 | Lieb et al. | 204/180 P |
| 4,147,605 | 4/1979 | Schenker et al. | 204/180 P |
| 4,203,822 | 5/1980 | Schenker et al. | 204/180 P |
| 4,303,487 | 12/1981 | Carlin et al. | 204/180 P |
| 4,387,008 | 6/1983 | Winyall et al. | 204/101 |
| 4,410,405 | 10/1983 | Bergna | 204/180 P |
| 4,508,607 | 4/1985 | Winyall | 204/180 P |

FOREIGN PATENT DOCUMENTS 39-2234  4/1964  Japan ............... 204/180 P

Primary Examiner—Andrew H. Metz
Assistant Examiner—Terryence Chapman
Attorney, Agent, or Firm—Cushman, Darby & Cushman

[57] ABSTRACT

The ratio of silicate to alkali in silicate liquors is increased, for example to convert alkaline grades to neutral grades, by passing the liquors through an electrodialysis stack comprising alternating anion exchange membranes and cation exchange membranes mounted between an anode and a cathode, the membranes being spaced apart to provide cells through which a fluid can be passed, the method comprising passing the silicate liquor through those cells having their anion exchange membranes on the anode side and passing water or an aqueous solution through the other cells, whereby the silicate liquor is caused to lose alkali metal ions.

8 Claims, 2 Drawing Figures

METHOD OF CONCENTRATING SILICA IN AN AQUEOUS ALKALI METAL SILICATE SOLUTION

BACKGROUND OF THE INVENTION

1. Field of the Invention.

The invention relates to the preparation of alkali metal silicates, and especially to sodium silicates, as these are used commercially for a wide range of applications.

2. Description of Related Art

Most sodium silicate liquors are produced by the Furnace route in which soda ash (sodium carbonate) and sand are fused together at high temperatures, e.g. around 1500° C. and the resulting glass is dissolved under pressure. Silicates in a wide range of grades can be produced in this manner, varying from those having $SiO_2:Na_2O$ weight ratio in the range 1.65 to 2.8 (often referred to as alkaline grades) to grades having higher ratios, e.g. up to about 4.0 (often referred to as neutral grades even though their solutions generally have pH values in excess of 11). Unfortunately, this route is highly energy dependent, and hence expensive to operate.

An alternative, lower energy, process, known as the Hydrothermal process, is also currently being operated. This process involves digestion of sand with caustic soda under pressure, and with much lower temperatures being required, significant savings in energy and manpower costs are achievable by this route. Unfortunately this process is unable to produce neutral grades. It has previously been proposed to overcome this by electrolysis of the resulting sodium silicate liquor in a standard electrolytic cell, having an anode compartment (containing an anode) and a cathode compartment (containing a cathode), the two compartments being separated by a single cation exchange membrane to keep the electrolysis products apart. This relies on an anode reaction to destroy hydroxyl ions in the anode compartment (forming water and releasing gaseous oxygen) while forming new hydroxyl ions in the cathode compartment (with release of hydrogen at the electrode). The driving current is carried through the membrane by the sodium ions passing through it, and the net effect is the removal of sodium hydroxide from one stream to the other, even though the individual hydroxyl ions lost from one stream are not those being newly created in the other. Such electrolytic methods for increasing the $SiO_2:Na_2O$ weight ratios are claimed to be effective for dilute solutions, i.e. water content of at least 75 weight %, and hence for enabling neutral grades to be produced via the Hydrothermal process more cheaply than via the Furnace route.

SUMMARY OF THE INVENTION

We have now devised another method for increasing the ratio of silica to alkali, which method can be operated with even lower energy costs, which can avoid the risk of electrode contamination inherent in electrolytic cells, and which can be used with silicate solutions of significantly higher solids content (thereby reducing evaporation costs). Accordingly we now provide a method for increasing the ratio of silica to alkali in an aqueous solution of alkali metal silicate, which method comprises passing the aqueous solution through an electrodialysis stack comprising a plurality of ion exchange membranes, each membrane having at least one adjacent membrane from which it is separated by at least one spacer, the spacer being shaped and positioned to form with the two membranes a cell having an inlet and outlet such that fluid can be caused to flow through the cell between the membranes and in contact therewith, alternate membranes being cation and anion exchange membranes respectively whereby each cell comprises a cation exchange membrane on one side and an anion exchange membrane on the other, the anion exchange membranes being preferentially selective towards hydroxyl ions compared with silicate ions, each of the individual cells being free from electrodes but the stack having adjacent to each end cell thereof an electrode compartment which contains an electrode separated from the contents of its adjacent end cell by the ion exchange membrane defining the boundary of that cell; the method further comprising applying a DC potential across the two electrodes thereby to provide an anode and a cathode respectively, feeding the solution of alkali metal silicate to the inlets of those alternate cells which have their anion exchange membrane on their anode side and correspondingly their cation exchange membrane on their cathode side, and feeding to the other cells either water or an aqueous solution; whereby alkali metal ions are caused to migrate through the cation exchange membranes and a higher proportion of hydroxyl ions than silicate ions are caused to migrate through the anion exchange membranes of each cell, thereby depleting the silicate streams of alkali as they flow through the stack.

This method operates by transferring ions, including hydroxyl ions, through the membranes from the silicate liquor stream into the streams of adjacent cells, rather than by the previously known methods of destroying hydroxyl ions in the silicate liquor stream and forming fresh hydroxyl ions in the adjacent stream.

BRIEF DESCRIPTION OF THE DRAWINGS

To illustrate how this is achieved, a specific embodiment of the invention will now be described with reference to the accompanying drawings, in which.

DESCRIPTION OF THE PREFERRED EMBODIMENTS

Figure 1:
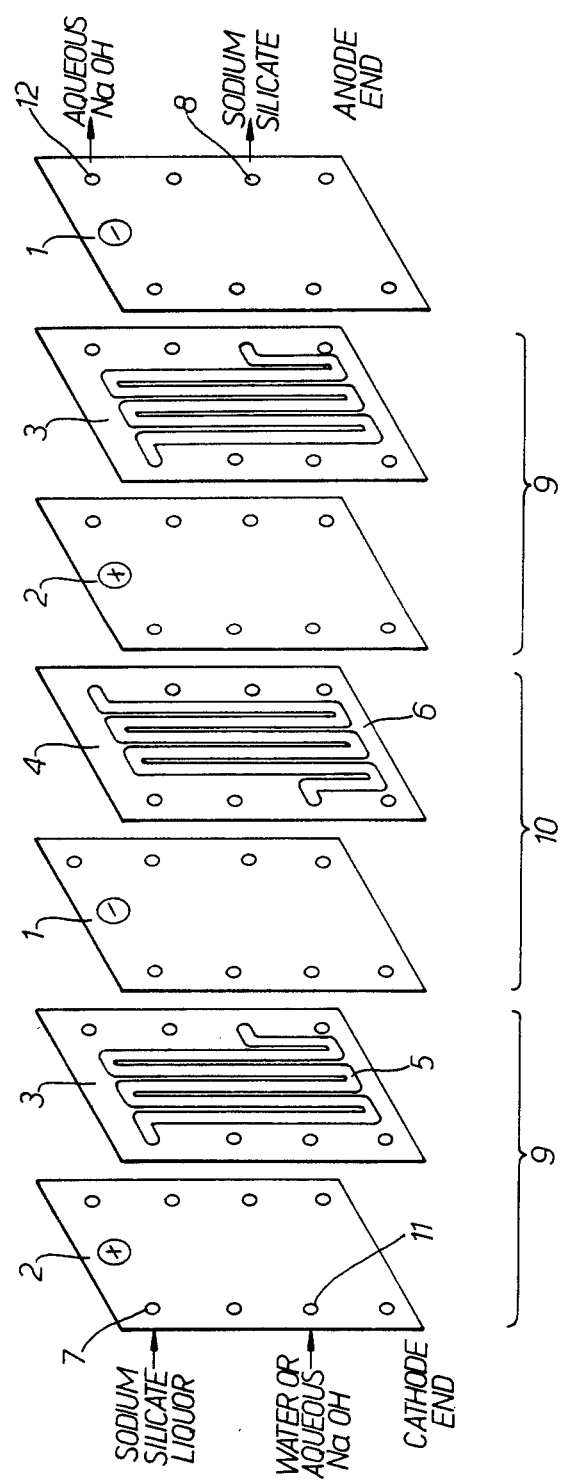
FIG. 1 is an exploded view of part of an electrodialysis stack showing how anion and cation exchange membranes are arranged alternately with the appropriate spacers between them.

In FIG. 1, anion exchange membranes 1 and cation exchange membranes 2 are arranged alternately throughout the stack with typically several hundred membranes being used in a stack for a commercial production plant. Between adjacent membranes are spacers of two sorts, one 3 for the diluting sodium silicate liquor stream and the other 4 for the intervening streams; although in practice the spacers themselves are usually of identical asymmetric shape, being orientated differently to give the different configurations necessary, e.g. as shown in the drawings where four inlet and four outlet manifolds are formed and hence are available for use (although as only two of each are actually used here, less versatile spacers with only four manifolds could have been used instead). The spacers each have a serpentine slot 5 providing a tortuous path along which liquid can flow from one end to the other, in contact with the adjacent membranes 1, 2. Around the inner tortuous path region is a continuous edge portion 6 to provide a seal against loss of liquid through the edges, each adjacent pair of membrane and their intervening spacer forming a cell through which the liquids can flow, each membrane thus also being part of the two cells on either side of it. Extending right through the stack are eight manifolds formed by aligned holes in the edge portions of the membranes and spacers. The tortuous paths of alternate cells connect different manifolds, so that in one cell a sodium silicate liquor inlet manifold 7 is connected to a sodium silicate outlet manifold 8 by the tortuous path, thus producing a diluting cell 9 for carrying the diluting liquor stream. In the two adjacent concentrating cells 10, the tortuous path connects an inlet manifold 11 for the water or aqueous caustic concentrating stream, with the concentrated caustic outlet manifold 12. The whole stack is completed by an anode compartment at one end and a cathode compartment at the other (neither compartment being shown in FIG. 1), there being no electrodes in the individual diluting and concentrating cells.

Figure 2:
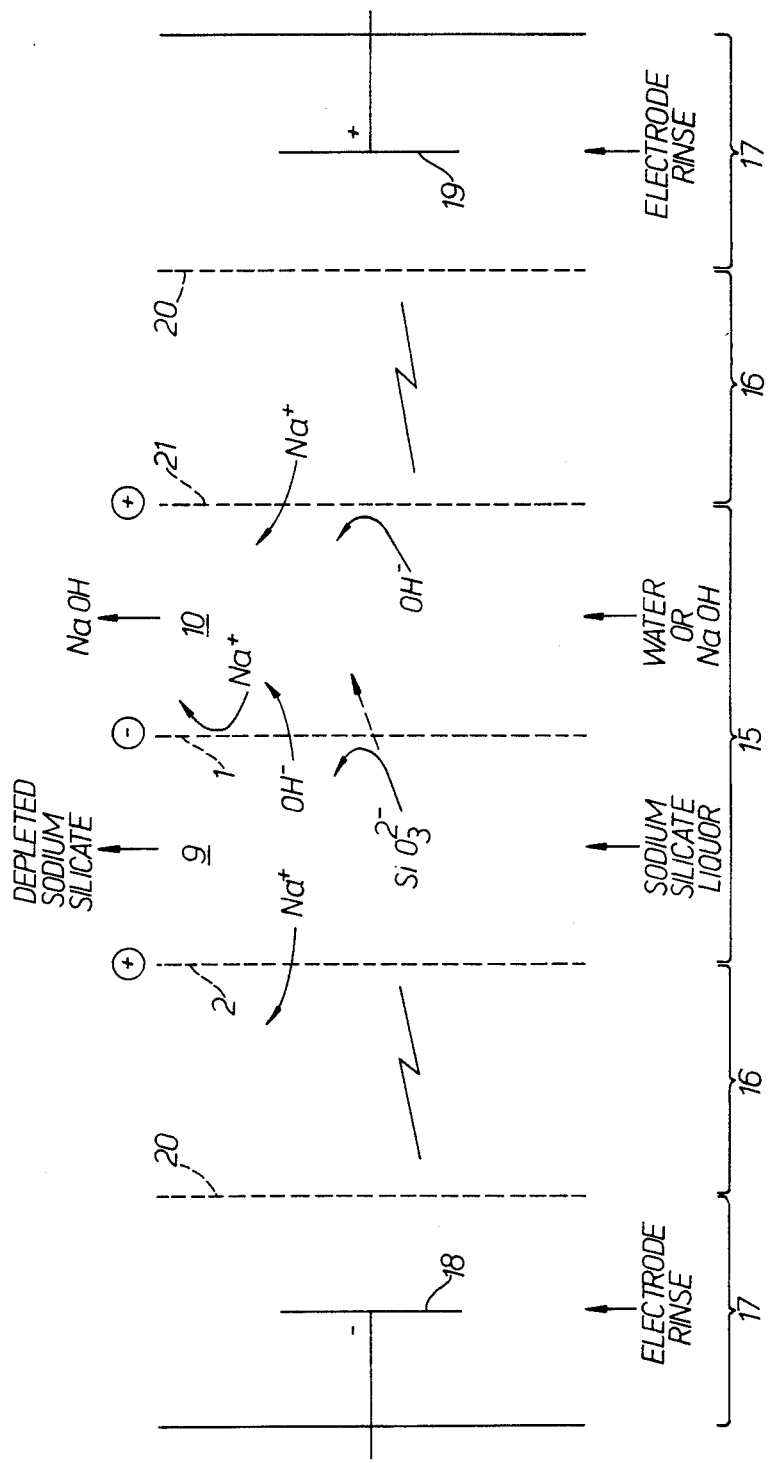
FIG. 2 is diagrammatic representation of a typical cell pair showing ion movements between the cells.

FIG. 2 shows a single cell pair 15 comprising a diluting cell 9 carrying a sodium silicate liquor stream and a concentrating cell 10 carrying a caustic stream (which may start as water). On either side of the cell pair are shown spaces 16 representing the remaining cell pairs of the stack. At either end are electrode compartments 17 containing a cathode 18 and an anode 19 respectively. Electrode rinse streams are passed through the electrode compartments, and these are separted from the contents of the adjacent end cells of the stack by the ion exchange membranes 20 forming the outer boundaries of those end cells.

In both drawings, a positive or negative sign on a membrane is meant to indicate the ion species which will pass through the membrane rather than the ions of which it is formed. Thus for example, a cation exchange membrane comprising immobilised anions will pass cations but block anions, and is thus represented in these drawings with a positive sign.

In use, sodium silicate liquor is supplied to the appropriate manifold 7 which distributes it to all the diluting cells. Water or sodium hydroxide solution (or indeed almost any other aqueous solution although any other solute would contaminate a potentially useful byproduct) is fed to the other inlet manifold 11 and this is likewise distributed to flow through all the concentrating cells. As the silicate liquor flows along the tortuous path between the membranes, the alkali metal ions are attracted towards the cathode, and some will pass through the cation exchange membrane into the adjacent cell. However, once in that adjacent cell they are trapped and prevented from travelling further towards the cathode by the next membrane, which is an anion exchange membrane.

The silicate liquor also contains silicate and hydroxyl ions, both of which will be attracted towards the anode. However, the anion exchange membrane is selective towards the hydroxyl ions so that substantially more hydroxyl ions will pass through into the adjacent concentrating cell than the silicate ions. Ideally none of the silicate ions should pass through the membrane, but in practice some will usually be lost in this manner. However, conditions for enhancing the selectivity and reducing this loss of silicate ions, are described hereinbelow. As the hydroxyl ions continue to move towards the anode, they will eventually reach the cation exchange membrane 21, through which they cannot pass, and hence become trapped in that concentrating stream.

The overall effect is that sodium and hydroxyl ions move out of the silicate liquor stream, thereby enhancing the $SiO_2:Na_2O$ weight ratio. The moving ions become trapped in their new streams which starting as water or aqueous caustic, receive both sodium and hydroxyl ions (together with water), to provide a useful byproduct of strong caustic. All this is achieved by migration of ions without any of these ions being produced by electrode reactions. However, even the present migratory method cannot be totally divorced from electrode reactions, as it is the electrode reactions occuring at either end of the stack that power the migrations through the cell membranes. However, the reactions at the single pair of electrodes suffices to furnish the migrations of the whole stack, typically comprising up to several hundred cell pairs, in a commercial plant scale stack, and the electrode energy costs are shared by the whole stack. Moreover, as the electrode reactions themselves do not affect the nature of the migrations throughout the stack, the most cost effective electrode reactions can be selected and carried out by bathing the electrodes in a rinse appropriate to the selected reaction. In particular, a preferred process is one which comprises maintaining each electrode in an electrode rinse comprising a conducting liquid substantially free from silicate ions.

The intermembrane spacers perform two main roles, i.e. to hold the membrane spaced apart to enable liquids to flow between them, and to distribute the liquid flow by defining the path for it to take. Usually they are also required to promote turbulence in the liquid as it flows. There are two types of spacer presently in use, these being known generally as sheet flow and tortuous path spacers. The former may be merely a plastic gasket sealing around the perimeter of the cell, with built in manifolds and entry and exit ports, but usually it also incorporates a turbulence promoting plastic mesh. In contrast a tortuous path spacer (e.g. as shown in FIG. 1) confines the liquid flow to a serpentine path winding its way to and fro between and in contact with the membranes, giving a flow path which compared with that provided by a sheet flow spacer, is longer, narrower and usually of constant cross sectional area. Examples of tortuous path spacers are those used by Ionics Inc in their electrodialysis plants.

Sheet flow spacers require much lower fluid velocities (5–20 cm sec$^{-1}$) for a similar degree of turbulence. They also mask the ion exchange membrane to a lesser extent than do the tortuous path spacers and are therefore more economical in membrane usage. The high liquid velocities used in tortuous path stacks result in higher pressure drops than are generally used in sheet flow systems, a typical pressure drop through a commercial tortuous path cell being over 2 bar. However, in the present process there is a tendency for silica to become deposited readily if the optimum conditions are unduly departed from, and we have now found that the inclination to deposit silica inadvertently or even to build up deposits of silica in the cells, is significantly less with the tortuous path configuration. Hence in the present process we prefer that at least the spacers of the cells carrying the silicate liquors be of the tortuous path type.

Even the so-called neutral grades of sodium silicate liquors generally have pH values only as low as 11, and when reduced to a pH below 9, silica will generally be deposited. We therefore prefer to keep the pH of the silicate liquor above 9 throughout the cell, including localised conditions that may occur adjacent to the membranes. To this end we prefer to use a current density which is less than 25 mA cm$^{-2}$, a flow velocity greater than 25 cm sec$^{-1}$ and a temperature greater than 25° C.

The onset of silica deposition can generally be detected by monitoring the stack voltage, a rise in the voltage inidicating silica deposition. A particularly preferred process is one comprising maintaining the above conditions within at least the silicate liquor streams, monitoring the voltage across the electrodes, and whenever the voltage starts to rise, decreasing the current density within the range 3-25 mA cm$^{-2}$, and/or increasing the flow velocity within the range 25-50 cm sec$^{-1}$ by an amount sufficient at least to stop any further rise. In carrying out this particular preferment it is desirable to maintain the current density as high as possible to maximise throughput. A higher current density may generally be used with a higher flow rate, but at the expense of higher energy consumption in achieving that higher flow rate. Hence a corollary to the above particular preferment is that while monitoring the voltage it is also preferred to raise the current density to the highest value within the range 3-25 mA cm$^{-2}$ and/or to reduce the flow velocity to the lowest value within the range 25-50 cm sec$^{-1}$ which can be achieved without substantial increase in stack voltage. While it is desirable to use as high a temperature as possible, most currently available membranes impose an upper limit of 60°-65° C. although higher temperatures could be used to advantage if suitable membranes should become available in the future. However, where the raw liquor is available (e.g. direct from the hydrothermal process) at only some intermediate temperature e.g. 30°-40° C., there would seem to be little advantage in supplying further heat.

Preferred initial concentrations for the silicate liquors lie within the range 20-30 wt % $SiO_2$, especially around the middle of that range for a typical alkaline silicate having a weight ratio of 2.4, this gives a total solids content range of (20+8.3=) about 28 to (30+12.5=) about 43 wt %, and correspondingly a water content of 72 to 57 wt % (this being a lower water content than the 75 wt % desirable when using an electrolytic cell). The lower the water content, the lower is the total quantity of energy needed to evaporate it off.

We claim:
1. A method for increasing the ratio of silica to alkali in an aqueous solution of alkali metal silicate which method comprises:
    (1) passing the aqueous silicate solution through an electrodialysis stack, the stack comprising alternating anion exchange membranes and cation exchange membranes which are mounted between electrodes and separated by spacers to form a plurality of cells through which a fluid can be caused to flow,
    (2) applying a DC potential across the electrodes to provide an anode and a cathode,
    (3) feeding the silicate solution to alternate cells in the stack having their anion exchange membrane on the anode side,
    (4) feeding water or an aqueous solution to the other cells in the stack, and
    (5) withdrawing from the stack a silicate solution depleted of alkali metal ions and an aqueous solution enriched in alkali metal ions.
2. A method as claimed in claim 1 wherein the pH of the silicate solution is maintained above 9 throughout its passage through the cells.
3. A method as claimed in claim 1 wherein the voltage across the electrodes is monitored and whenever the voltage starts to rise the current density is decreased and/or the silicate solution flow density is increased by an amount sufficient to at least stop any further rise in the voltage.
4. A method as claimed in claim 3 wherein the current density is maintained in the range 3-25 mAcm$^{-2}$ and the solution flow density is maintained in the range 25-50 cm sec$^{-1}$.
5. A method as claimed in claim 3 or claim 4 which utilizes the maximum current density and the minimum solution flow velocity which can be achieved without a substantial increase in stack voltage.
6. A method as claimed in claim 4 wherein current density is less than 25 mAcm$^{-2}$, solution flow viscosity is greater than 25 cm sec$^{-1}$ and the temperature of the solution is greater than 25° C.
7. A method as claimed in claim 1 wherein the silicate solution initially contains 20-30% by weight silica.
8. A method as claimed in claim 1 wherein said aqueous solution fed to the other cells in the stack is a solution of an alkali metal hydroxide.

* * * * *